United States Patent Office 2,900,400
Patented Aug. 18, 1959

2,900,400

14α-HYDROXY PREGNATRIENES

David H. Gould, Leonia, Emanuel B. Hershberg, West Orange, and Elliot Shapiro, Irvington, N.J., assignors to Schering Corporation, Bloomfield, N.J., a corporation of New Jersey No Drawing. Application April 30, 1956
Serial No. 581,265

20 Claims. (Cl. 260—397.45)

This invention relates to a new group of steroid compounds and to methods for their manufacture. More particularly, our invention relates to oxygenated pregnatetraenes which are potent hormone-like substances.

In this application we employ the accepted terminology for identifying the carbon atoms of a pregnane and reproduce below the 10,13-dimethylpregnane skeleton.

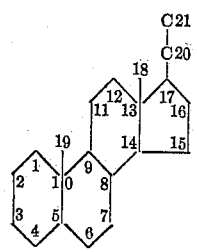

The compounds of our invention are represented by unsaturated pregnanes having the following general formula

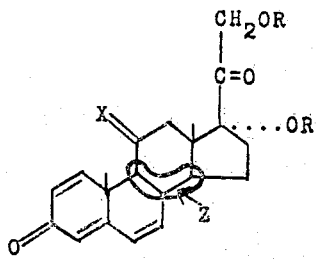

wherein X is a member of the group consisting of (H,αOR), (H,βOR), and O; R is a member of the group consisting of H and acyl; Z denotes the arrangement of C–8, C–9, and C–14 consisting of

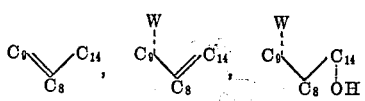

and W is a member of the group consisting of H, F, Cl and Br.

The compounds of the general formula which are devoid of a halogen group at C–9 exhibit an interesting distribution of pharmacological properties. In general, those compounds possessing an OH group at C–17 together with either a βOH or keto function at C–11 are adrenocorticoid in their action. The compounds are useful in the treatment of inflammation, arthritic diseases and certain other collagen diseases such as disseminated lupus, polyarteritis and the like, and are advantageously employed over known corticoids, such as cortisone and desoxycorticosterone in that they are relatively devoid of electrolyte retention. Thus, following administration of these pregnatetraenes there is relatively little sodium retention and concomitant edema, which is so common with many of the adrenocortical hormones and corticoids heretofore in use. In combination with mineralocorticoids such as desoxycorticosterone, our compounds provide and enhance resistance to stress and aid in the control of carbohydrate metabolism. Corollary to the foregoing, these pregnatetraenes are useful in suppression of pituitary ACTH output.

A further important application of these new steroids is in the treatment of allergic phenomena such as asthma, and certain types of perennial rhinitis, angioneurotic edema, and drug sensitivities, which do not respond to usual antihistaminic therapy. Moderate doses of these substances are effective in giving prompt relief to an acute asthmatic attack, or resistant status asthmaticus, which might otherwise prove fatal.

The 9α-halogenated compounds of the general formula are useful in maintaining bilateral adrenalectomized patients and Addisonians.

Topical preparations of the compounds of the invention in the form of ointments, suspensions and the like, lend themselves to ophthalmological use where they are used to block inflammatory reactions arising from allergic disorders, as well as bacterial or toxic origins (such as acute iritis).

Those compounds of the general formula possessing an acyloxy group at C–17, especially in combination with a C–11 ester function and/or a C–21 ester group such as 1,4,6,8(9)-pregnatetraene-11β,17α,21-triol - 3,20 - dione-11-formate-(or acetate)-17-acetate and the corresponding C–21 esters, are progestational agents showing 0.5–1.5 times the activity of progesterone.

Our new substances may be administered for their particular therapeutic use either orally or parenterally in the form of tablets, capsules, aqueous or oil suspensions or solutions. In the usual corticoid treatment such as antiinflammatory therapy, replacement therapy, and the like, the daily dose is 5–10 mg. depending upon the extent of therapy required. In the treatment of allergic phenomena, a higher daily dose in the range of 10–20 mg. is required to effect relief from acute bronchial asthma.

We have found that esterification of the compounds of our invention in the C–21 position allows for an extension of the duration of activity over that exhibited by the free C–21 alcohol. For example, lower alkanoic acid radicals and cycloaliphatic alkanoic acid radicals such as acetate, propionate, iso-valerate, enanthate and cyclopentylpropionate are particularly effective in this instance. Furthermore, certain aryloxy alkanoic acid radicals and certain heterocyclic carboxylic acid radicals, when attached in the form of an ester link at C–21, provide for a longer duration of activity than is obtained with the lower alkanoic acid radicals, and thus permit the utilization of a smaller dose to achieve a desired result. By way of example, such radicals include phenoxyacetate, substituted phenoxyacetates such as 4-bromo-, 4-methyl-, 4-tertiary butyl-, 2,4,5-trichloro- and 4-methoxy-phenoxyacetates. As examples of the heterocyclic carboxylic acid radicals, we have found that the furoates and substituted furoates including the 5-bromo-, 5-methyl-, and 5-tertiary-butylfuroate radicals are especially valuable.

Since the unesterified compounds of the formula together with their monobasic acid esters are essentially insoluble in water, we can overcome this difficulty and can provide for water solubility by forming non-toxic metal salts such as the sodium salts of monoesters of polycarboxylic acids such as succinic, phthalic, tricarballylic, itaconic acids, etc., preferably at C–21.

As indicated above, we envision as falling within our invention the 14α-OH compounds of the formula

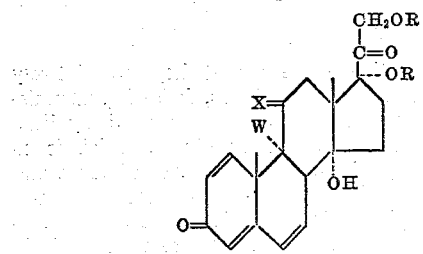

wherein W, X and R have the same designation as given. The 14α-hydroxylated steroids exhibit the aforementioned therapeutic properties and differ from the pregnatetraenes pharmacologically more in degree than in kind. More important, these 14α-hydroxylated compounds are important and necessary intermediates in the synthesis of the corresponding 1,4,6,8(14)-pregnatetraenes.

The 1,4,6,8(9)-pregnatetraenes of our invention are preferably prepared from 1,4,6-pregnatriene-17α,21-diol-3,20-diones which possess an oxygen function at C-11. The 1,4,6-pregnatrienes used as starting materials are synthesized according to the procedure described in copending application of Gould and Herzog, Serial No. 513,901, filed June 7, 1955. After substitution of an anionic radical such as hydroxyl, halide, sulfate, sufonate, nitrate, etc., for an hydrogen atom on either C-8 or C-9, the subsequent elimination of a proton with the anion gives rise to the pregnatetraenes of this invention. Thus, for example, incubation of 1,4,6-pregnatriene-17α,21-diol-3,11,20-trione with a microorganism which is known to hydroxylate at the C-8 or C-9 position, such as *Helicostylum piriforme* or *Neurospora crassa*, as described in the copending application of Hershberg and Herzog, Serial No. 486,028, filed February 3, 1955, gives rise to the corresponding C-8-(or 9) hydroxy derivative. The exact position at which hydroxylation occurs is unknown. However, for the purposes of this process, it is unimportant, since the intermediary compound so obtained from microbiological procedure is dehydrated so as to introduce an additional double bond between C-8 and C-9. The dehydration is easily accomplished chemically by a variety of agents such as alumina, inorganic bases (sodium hydroxide, sodium bicarbonate, etc.), aqueous acetic acid, p-toluenesulfonic acid in chloroform or by heating in xylene. This sequence of reactions is shown in the following schematic diagram. (The uncertainty of the point of attachment of the hydroxyl group introduced by the microorganism is indicated by the use of a bracket indicating that attachment may be at either C-8 or C-9).

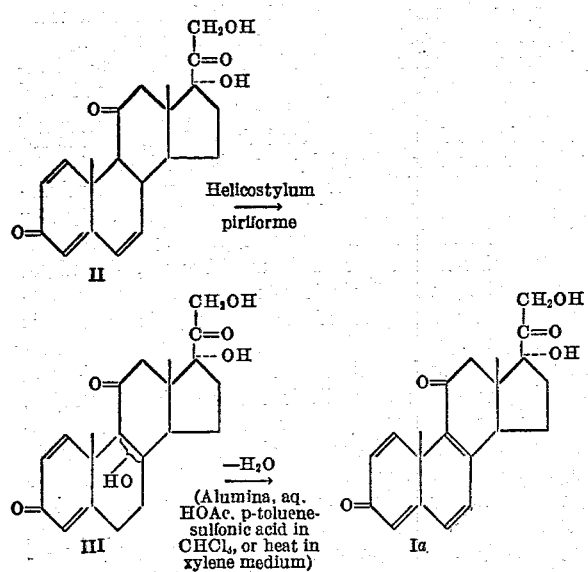

We prefer, however, to use a halogen such as chlorine, bromine, or iodine as the anionic substituent at C-9 and we also prefer the chemical approach to the overall synthesis. This preferred process is shown in the following equation

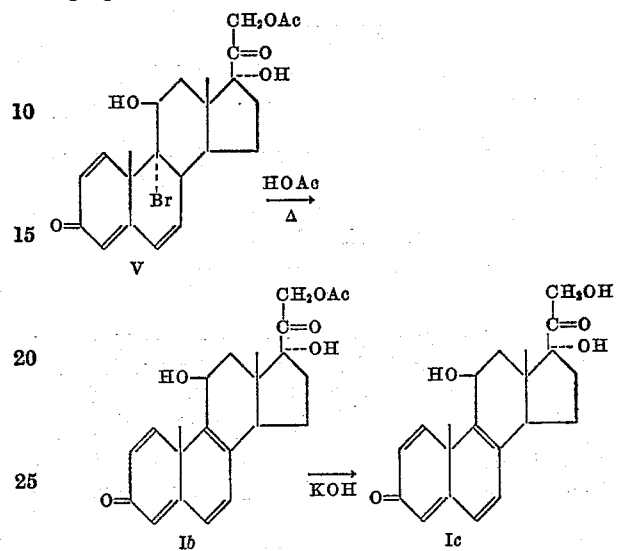

The starting compound V in this instance indicated as a 9α-bromo substance may also be a 9α-chloro or 9α-fluoro-analog, and is prepared according to the analogous procedure described in the copending application of Gould and Herzog, Serial No. 513,901, filed June 7, 1955. The elimination of hydrohalic acid between C-8 and C-9 is effected in a known manner for dehydrohalogenation (such as by heating the 9α-halotriene in the presence of acetic acid) gives rise to the 1,4,6,8(9)-pregnatetraene-11β,17α,21-triol-3,20-dione 21-acetate (Ib). Saponification of the 21-ester is easily accomplished by treatment with dilute alkali as indicated, yielding Ic. Alternatively, the dehydrohalogenation may be effected with other reagents such as collidine or sodium acetate in acetic acid on the corresponding 11-keto-analogs of V.

We have also found that the compounds described in copending application, Serial No. 513,901, filed June 7, 1955, are useful intermediates in the preparation of the pregnatetraenes of this invention, in that they lend themselves to the insertion of a halogen atom at the C-8 position as shown in the following equation

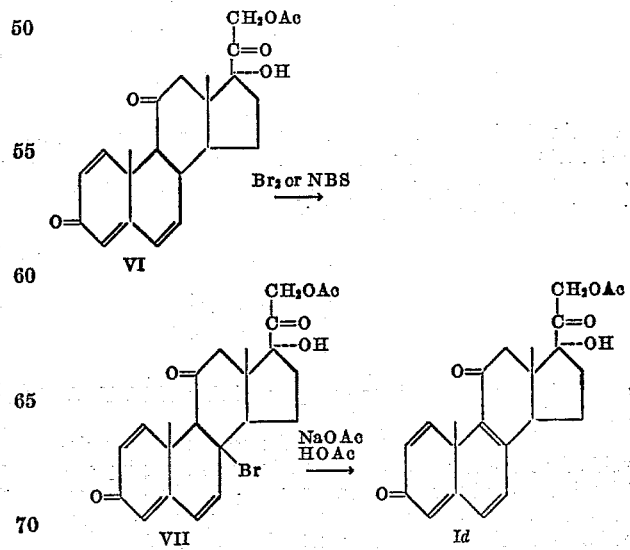

In the foregoing a 21-ester such as the acetate of 1,4,6-pregnatriene-17α,21-diol-3,11,20-trione is reacted with a source of positive halogen ion such as bromine or N-bromosuccinimide whereby a bromine atom is introduced at C-8 (VII). Dehydrohalogenation with sodium acetate in acetic acid, for example, gives rise to 1,4,6,8(9)-pregnatetraene-17α,21-diol-3,11,20-trione 21-acetate.

If, in this sequence of reactions, the starting material is the 11β-hydroxy analog of VI, we prefer to first formylate the 11β-hydroxyl group with formic acid, according to the procedure described by Oliveto, et al., in the copending application, Serial No. 421,948, filed April 8, 1954. After dehydrohalogenation, one obtains the corresponding 1,4,6,8(9)-pregnatetraene containing an 11β-formyloxy group. Saponification is easily effected by means of alkali or microbiologically, using Flavobacterium dehydrogenans var. hydrolyticum as described in the copending application of Charney, Serial No. 458,661, filed September 27, 1954, now abandoned.

We have found that when the anionic substitutent is adjacent to an activated hydrogen atom, it is easily removed with the said hydrogen atom by relatively mild treatment with acid or base which may be accompanied by heating. For example, reagents such as acetic or formic acids, sodium acetate, alkali bicarbonates, carbonates or heating in inert solvents are useful in effecting this dehydrohalogenation. On the other hand, when the substituent is not adjacent to an activated hydrogen atom such as would be in the situation when the starting material is 1,4,6-pregnatriene-11β,17α,21-triol-3,20-dione-11-formate-21-acetate, somewhat stronger measures to effect dehydrohalogenation are necessary. Methods for effecting this type of dehydrohalogenation are exemplified by dehydration with a strong acid; moderate pyrolytic procedures in the presence of organic bases such as collidine, quinoline, etc., at 150–250°; treatment with strong dehydrohalogenators such as silver or mercury salts in organic solvents such as pyridine, collidine, acetonitrile, etc.

In order to prepare the 1,4,6,8(14)-pregnatetraenes of the general formula, we prefer to hydroxylate a 1,4,6-pregnatriene at the C-14 position, isolate the 14α-hydroxy compound and dehydrate to the tetraene. The following sequence of reactions illustrates a method for preparting the 14α-hydroxy intermediates

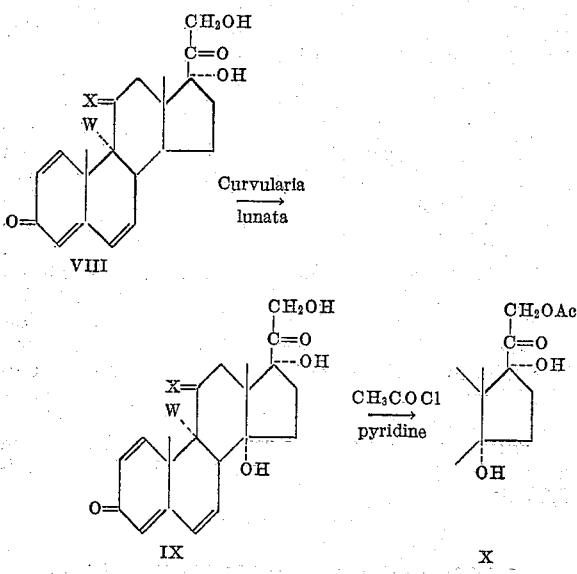

In the above reaction a pregnatriene (VIII) is subjected to the oxygenating activity of a microorganism which hydroxylates in the 14α-position such as *Curvularia lunata*. The product so formed is the corresponding 14α-hydroxypregnatriene, IX, which may be esterified at C-21 with acetyl chloride in pyridine, for example.

Alternatively a 4,6-pregnadiene such as 4,6-pregnadiene-17α,21-diol-3,11,20-trione may be hydroxylated with *Curvularia lunata* so as to produce the corresponding 14α-hydroxy-pregnadiene. Subjecting the latter compound to the dehydrogenating action of a dehydrogenating organism, such as *C. simplex* or *B. sphaericus* affords 1,4,6-pregnatriene-14α,17α,21-triol-3,11,20-trione. Conversion of the 14α-hydroxy compounds to 1,4,6,8(14)-pregnatetraenes is carried out in a facile manner. In general, the major step is the removal of an anionic substituent at C-14 together with the hydrogen atom at C-8 which is activated by the conjugated unsaturation in rings A and B, leading to the insertion of a double bond between C-8 and C-14 which is in conjugation with the previous unsaturation. We generally prefer as the anionic substituent a 14α-hydroxyl group.

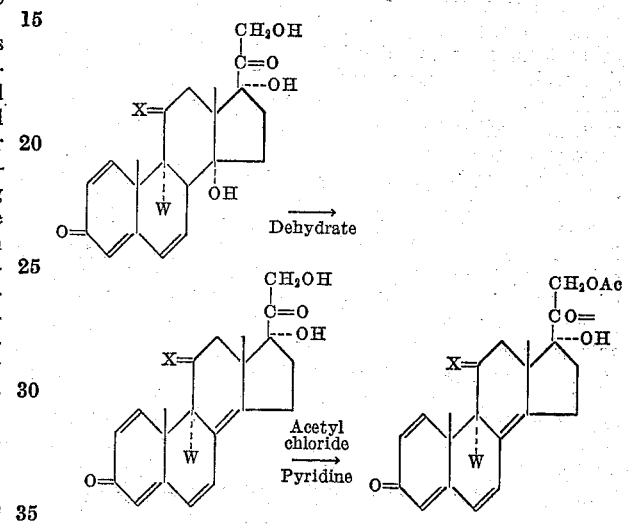

As dehydration procedures there are used the following: saponification or treatment with mild base; treatment with acid, particularly warming with dilute organic or weak acids; chromatography or other treatment with alumina, thoria and the like; esterification with acidic agents, e.g. acetic anhydride; and thermal splitting, e.g. by heating in toluene, xylene, collidine and the like. It is to be noted that stronger treatment with acid or base in the case of 1,4,6,8(14)-pregnatetraene-17α,21-diol-3,11,20-trione isomerizes the terminal double bond to give 1,4,6,8(9)-pregnatetraene-17α,21-diol-3,11,20-trione.

Partially esterified pregnatetraenes may be prepared according to a variety of prescribed procedures. We prefer in general to full esterify all hydroxyl groups which are present and then selectively saponify as required. For example, 1,4,6,8(9)-pregnatetraene-11β,17α,21-triol-3,20-dione may be acylated with reagents such as acetic anhydride and acetic acid preferably in the presence of p-toluene sulfonic acid whereby acetylation occurs at the 11,17 and 21-position affording the corresponding triacetate. Subjecting the triacetate so obtained to mild hydrolytic conditions results in the formation of the corresponding 11β,17α,21-triol-11,17-diacetate. Instead of the aforementioned acylating agent, other agents such as formic acid in the presence of p-toluenesulfonic acid are applicable and the corresponding formate esters are obtained.

An 11-keto 17,21 diester may be reduced either chemically or microbiologically according to known methods whereby the corresponding 11β-hydroxy-17,21 diester is produced. Other methods of preparing various combinations are set forth in the following examples.

The following examples are presented to illustrate various methods for preparing the compounds of our invention. It will be apparent to a chemist skilled in the art that various modifications are in essence no more than equivalents. Thus our invention is limited only as defined in the appending claims.

EXAMPLE 1

1,4,6,8-pregnatetraene-17α,21-diol-3,11,20-trione 21-acetate (A) A mixture of 500 mg. of 9α-chloro-1,4,6-pregnatriene-17α,21-diol-3,11,20-trione 21-acetate (prepared by substituting hydrogen chloride for hydrogen fluoride in the procedure described in the copending application of Gould and Herzog, Serial No. 513,901, filed June 7, 1955) and 10 ml. of γ-collidine is refluxed for 15 minutes. The cooled mixture is poured into excess sulfuric acid in ice, and extracted with methylene chloride. The organic layer is washed with water until neutral, dried and concentrated to a small volume. The concentrate is chromatographed on activated magnesium silicate and fixed by using hexane as the developer. Chromatographic elution with ether-hexane mixtures affords the compound of this example in the fraction where ether is the eluting solvent. Purification is effected by recrystallization from acetone-hexane.

(B) Alternatively, the compound of this example may be prepared by treating a solution of 300 mg. of 9α-bromo - 1,4,6 - pregnatriene - 17α,21 - diol-3,11,20-trione-3,20-acetate in 5 ml. of chloroform and 10 ml. of acetic acid with 56 mg. of anhydrous sodium acetate in 5 ml. of acetic acid. The mixture is refluxed for two hours, concentrated in vacuo and poured into water. The resultant precipitate from methylene chloride-hexane affords the tetraene of this example.

(C) A further procedure for the preparation for the compound of this example is as follows: To a stirred solution of 1.0 g. of 1,4,6-pregnatriene - 17α,21 - diol-3,11,20-trione-21-acetate in 10 ml. of methylene chloride is dropwise added 0.22 g. of bromine in 5 ml. of acetic acid at a rate governed by the disappearance of color due to excess bromine. After an additional 15 minutes stirring, the solution is concentrated in vacuo to remove methylene chloride and the residual mixture is poured into water. The solid is removed by filtration, washed with water, dried, and crystallized from acetone-hexane to give the intermediate 8-(or 9-) bromo-1,4,6-pregnatriene-17α,21-diol-3,11,20-trione 21-acetate.

The intermediary 8-bromo-1,4,6-pregnatriene-17α,21-diol-3,11,20-trione 21-acetate may alternatively be prepared according to the following:

A sample of 1 g. of 1,4,6-pregnatriene-17α,21-diol-3,11,20-trione 21-acetate is dissolved in 50 ml. of a 1:1 mixture of carbon tetrachloride and chlorobenzene. The solution is brought to a boil by irradiation with a 300 w. photoflood lamp and treated with 0.40 g. of N-bromosuccinimide. The mixture is boiled with irradiation for 10–15 minutes until the solution no longer gives a starch iodide test. The mixture is cooled, filtered, washed with water and evaporated to dryness in vacuo. Crystallization from methylene chloride-hexane affords the 8- (or 9-) bromo-1,4,6-pregnatriene-17α,21-diol-3,11,20 - trione 21-acetate. The 8-bromopregnatriene intermediate so obtained is dehydrohalogenated with sodium acetate in acetic acid according to the procedure described in part B yielding 1,4,6,8-pregnatetraene - 17α,21 - diol-3,11,20-trione 21-acetate.

EXAMPLE 2

1,4,6,8-pregnatetraene-17α,21-diol-3,11,20-trione

Nitrogen gas is passed through a solution of 50 mg. of the ester obtained in Example 1 in 5 ml. of methanol so as to remove dissolved air. To the methanolic acid is added 13 mg. of potassium bicarbonate in 0.5 ml. of water and the resulting mixture is allowed to stand in an atmosphere of nitrogen overnight. Dilution of the mixture with water affords a crystalline material which is removed by filtration and dried. Recrystallization from aqueous acetone affords the compound of this example.

EXAMPLE 3

1,4,6,8-pregnatetraene-11β,17α,21-triol-3,20-dione 21-acetate (A) A sample of 0.2 g. of 9α-bromo-1,4,6-pregnatriene-11β,17α,21-triol-3,20-dione 21-acetate is dissolved in 10 ml. of acetic acid containing 0.4 g. of sodium acetate and the solution is boiled 30 minutes. The solution is cooled and poured into water and the separated solid is extracted with methylene chloride. The organic layer is washed with aqueous sodium bicarbonate and water till neutral, and dried with anhydrous magnesium sulfate. The dried solution is filtered, concentrated and chromatographed on activated magnesium silicate. The fraction eluted with 10–25% methylene chloride in ether is crystallized from ethyl acetate to give 1,4,6,8-pregnatetraene-11β,17α,21-triol-3,20-dione 21-acetate.

(B) Alternatively, the compound of this example is prepared in the following manner. One gram of 1,4,6-pregnatriene-11β,17α,21-triol-3,20-dione 11-formate 21-acetate is brominated with 0.21 g. of bromine and the product is crystallized from aqueous acetone to give 8-bromo-1,4,6-pregnatriene-11β,17α,21-triol - 3,20 - dione 11-formate 21-acetate according to the procedure described in Example 1–C.

A sample of 0.8 g. of the bromopregnatriene so obtained is dissolved in 20 ml. of γ-collidine and treated with 1.5 g. of silver nitrate. The solution is warmed on the steam bath at 90–95° for 6 hours and poured into ice water. The mixture is acidified with dilute sulfuric acid and extracted with methylene chloride. The combined methylene chloride washes are washed neutral with water, dried over magnesium sulfate, filtered and evaporated. The residue is crystallized several times from acetone-hexane to give 1,4,6,8 - pregnatetraene - 11β,17α,21-triol-3,20-dione 11-formate 21-acetate.

EXAMPLE 4

1,4,6,8-pregnatetraene-11β,17α,21-triol-3,20-dione

A sample of 0.05 g. of the product of Example 3 is saponified and crystallized as in Example 2 to give 1,4,6,8-pregnatetraene-11β,17α,21-triol-3,20-dione.

Alternatively, the following process is applicable:

A mixture is prepared of 1 g. of yeast extract concentrate and 1 ml. each of 2 M potassium dihydrogen phosphate and 2 M disodium phosphate in each 100 ml. Ten Erlenmeyer flasks (300 ml.) containing 100 ml. each are sterilized and innoculated with *Flavobacterium dehydrogenans* var *hydrolyticum* according to the procedure described in copending application of William Charney, Serial No. 458,661, filed September 27, 1954. The flasks are shaken at 30° for 16 hours, and to each is added a solution of 50 mg. of 1,4,6-pregnatriene-11β,17α,21-triol-3,20-dione 11-formate 21-acetate in 5 ml. of methanol. The cultures are shaken at 30° for 24 hours and the combined broths are extracted three times with 300 ml. of methylene chloride and the extract is dried, filtered and evaporated to dryness. The residue is crystallized from acetone to give 1,4,6,8-pregnatetraene-11β,17α,21-triol-3,20-dione.

EXAMPLE 5

1,4,6,8(9)-pregnatetraene-11β,17α,21-triol-3,20-dione triacetate

A sample of 500 mg. of the triol of Example 4 is dissolved in a solution of 5 ml. of acetic acid and 5 ml. of acetic anhydride and treated with 50 mg. of p-toluenesulfonic acid. The mixture is allowed to stand overnight and upon dilution with water, the triacetate precipitates. The ester is separated by filtration and recrystallized from ether-hexane solvent, affording 1,4,6,8(9)-pregnatetraene-11β,17α,21-triol-3,20-dione triacetate.

EXAMPLE 6

*1,4,6,8(9)-pregnatetraene-17α,21-diol-3,11,20-dione diacetate*

A mixture of 500 mg. of the compound of Example 2 in 5 ml. of acetic anhydride and 5 ml. of acetic acid and 50 mg. of p-toluenesulfonic acid is processed according to the procedure described in Example 5. Recrystallization from ether-hexane mixtures affords the diacetate of this example.

EXAMPLE 7

*1,4,6,8(9)-pregnatetraene-11β,17α,21-triol-3,20-dione triformate*

To a mixture of 10 ml. of formic acid and 1 g. of the triol of Example 4 is added 100 mg. of p-toluenesulfonic acid. The mixture is chilled in a refrigerator for 48 hours after which time it is diluted with water and the resultant precipitate removed by filtration. The crude triformate so obtained is purified by recrystallization from ether-hexane.

EXAMPLE 8

*1,4,6,8(9)-pregnatetraene-11β,17α,21-triol-3,20-dione 11,17-diformate*

A solution of 1 g. of the triformate obtained in Example 7 in 20 ml. of absolute ethanol is treated with 100 mg. of p-toluenesulfonic acid monohydrate and the resultant mixture is stirred at 35 to 40° for about 2 hours. The mixture containing the partially saponified steroid is chilled overnight, diluted with water, and the resultant precipitate removed by filtration. Recrystallization from ether-hexane affords 1,4,6,8(9)-pregnatetraene-11β,17α,21-triol-3,20-dione-11,17 diformate.

EXAMPLE 9

*1,4,6-pregnatriene-14α,17α,21-diol-3,11,20-trione and 1,4,6-pregnatriene-8β,17α,21-triol-3,11,20-trione*

One hundred grams of edamine enzymatic digest of lactalbumin, 15 g. of corn steep liquor and 250 g. of cerelose is diluted to 5 l. with tap water and adjusted with soda to pH 4.3–4.5. The medium is divided into twenty-five 500 ml. flasks and sterilized by heat, cooled and inoculated with a culture of *Helicostylum piriforme*, A.T.C.C. No. 8992. The flasks are incubated 24 hours at 28° while shaking on a shake table. To each flask is added a solution of 50 mg. of 1,4,6-pregnatriene-17α,21-diol-3,11,20-trione (prepared according to the procedure described in copending application of Gould and Herzog, Serial No. 513,901, filed June 7, 1955) dissolved in a minimum amount of acetone. The flasks are again shaken and incubated at 28° for 24 hours, after which 50 ml. of methylene chloride is added to each flask. After shaking, the organic layer is separated and combined with a second methylene chloride wash. The combined solutions are dried, filtered and evaporated to a crystalline residue. This residue is triturated with hexane and the hexane withdrawn. The remainder is dissolved in a minimum amount of methylene chloride (30–50 ml.), and chromatographed on 50 g. of activated magnesium silicate. The column is washed with 500 ml. of anhydrous ether, and 1 l. of methylene chloride followed by five 200 ml. fractions of methylene chloride containing 0.5% methanol and five fractions containing 1% methanol. Elution of the desired product is obtained with 1.5–3% methanol in methylene chloride. Crystallization of the residue obtained on evaporation from acetone-hexane gives 1,4,6-pregnatriene-14α,17α,21-triol-3,11,20-trione. Further elution with 3–5% methanol in methylene chloride gives a different product, 1,4,6-pregnatriene-8β,17α,21-triol-3,11,20-trione, also crystallizable from acetonehexane.

EXAMPLE 10

*1,4,6-pregnatriene-14α,17α,21-triol-3,11,20-trione 21-propionate*

A sample of 0.1 g. of the 14α-hydroxy product of Example 9 is dissolved in 5 ml. of dry pyridine and chilled to 5°. This solution is treated with 50 mg. of propionyl chloride with stirring at 0° for 15 minutes and at 15° for 15 minutes. The mixture is poured into 50 ml. of water and extracted with methylene chloride. The organic layer is washed with dilute hydrochloric acid, dilute sodium bicarbonate and water until neutral. The dried solution is filtered and evaporated to a residue which is crystallized from aqueous acetone to give 1,4,6-pregnatriene-14α,17α,21-triol-3,11,20-trione 21-propionate.

EXAMPLE 11

*1,4,6-pregnatriene-11β,14α,17α,21-tetrol-3,20-dione and 1,4,6-pregnatriene-8β,11β,17α,21-tetrol-3,20-dione*

The procedure of Example 9 is repeated using as substrate 1,4,6-pregnatriene-11β,17α,21-triol-3,20-dione in the same amounts. The residue is chromatographed as above and washing with 2–4% methanol in methylene chloride elutes fractions which on evaporation and crystallization from methylene chloride-hexane give the desired product, 1,4,6-pregnatriene-11β,14α,17α,21-tetrol-3,20-dione. Further washing with 4–6% methanol in methylene chloride elutes crystalline material which on crystallization from methylene chloride-hexane gives 1,4,6-pregnatriene-8β,11β,17α,21-tetrol-3,20-dione.

EXAMPLE 12

*1,4,6-pregnatriene-11β,14α,17α,21-tetrol-3,20-dione 21-caproate*

Using the procedure of Example 10 with the 14α-hydroxy compound of Example 11 and caproyl chloride, the desired product is obtained. It is crystallizable from methanol and aqueous acetone.

EXAMPLE 13

*9α-fluoro-1,4,6-pregnatriene-14α,17α,21-triol-3,11-20-trione*

A mixture is prepared of 1% yeast extract concentrate including 90 ml. of an 0.2 M $KH_2PO_4$ and 90 ml. of 0.2 M $Na_2HPO_4$ in ten 300 ml. Erlenmeyer flasks. The medium is sterilized by autoclaving for 15 minutes at 120° C. and the cooled broth in each flask is inoculated with 1 ml. of a suspension of *Curvularia lunata* from a 24-hour broth culture. The mixtures are incubated on a shake table for 20 hours at 28° C. After incubation each flask is treated with a solution containing 50 mg. of sterile 9α-fluoro-1,4,6-pregnatriene-17α,21-diol-3,11,20-trione in 5 ml. of ethanol. The pH is 6.8–7.2. The cultures are then incubated and shaken for 48 hours at 28° C. The pH is 7.0–7.4. The cultures are then extracted thoroughly with chloroform. The extracts are combined and evaporated to dryness, giving a residue of ca. 500–600 mg.

The crude extract is triturated with methanol giving a crystalline solid which is crystallized from acetone to give 9α - fluoro-1,4,6 - pregnatriene - 14α,17α,21 - triol-3,11,20-trione.

EXAMPLE 14

*9α-fluoro-1,4,6-pregnatriene-11β,14α,17α,21-tetrol-3,20-dione*

Example 13 is repeated using as substrate 9α-fluoro-1,4,6-pregnatriene-11β,17α,21 - triol-3,20 - dione. The product is crystallized from methylene chloride-hexane to give 9α-fluoro - 1,4,6 - pregnatriene - 11β,14α,17α,21-tetrol-3,20-dione.

EXAMPLE 15

*9α-bromo-1,4,6-pregnatriene-11β,14α,17α,21-tetrol-3,20-dione*

Using the procedure of Example 13 with 9α-bromo-1,4,6-pregnatriene - 11β,17α,21 - triol - 3,20 - dione, a residue is obtained which is crystallized from acetone-hexane to give 9α - bromo - 1,4,6 - pregnatriene - 11β,14α,17α,21-tetrol-3,20-dione.

EXAMPLE 16

*9α-chloro-1,4,6-pregnatriene-14α,17α,21-triol-3,11,20-trione*

Using the procedure of Example 13 with 9α-chloro-1,4,6-pregnatriene-17α,21-diol-3,11,20 - trione a product is obtained which on crystallization from aqueous acetone gives 9α-chloro - 1,4,6 - pregnatriene - 14α,17α,21-triol-3,11,20-trione.

EXAMPLE 17

*21-acetates of 14α-hydroxy compounds*

Using the procedure of Example 10 with acetic anhydride in place of propionyl chloride, a residue is obtained, which gives on crystallization from methanol 1,4,6 - pregnatriene - 14α,17α,21 - triol - 3,11,20 - trione 21-acetate.

The same procedure applied to the 14α-hydroxy compound of Example 11 gives on crystallization from acetone 1,4,6 - pregnatrien - 11β,14α,17α,21 - tetrol - 3,20-dione 21-acetate.

The same procedure with the product of Example 13 gives on crystallization from acetone-hexane 9α-fluoro-1,4,6 - pregnatriene - 14α,17α,21 - triol - 3,11,20 - trione 21-acetate.

The same procedure with the product of Example 14 gives on crystallization from acetone 9α-fluoro-1,4,6-pregnatriene - 11β,14α,17α,21 - tetrol - 3,20 - dione-21-acetate.

EXAMPLE 18

*1,4,6,8(14)-pregnatetraene-11β,17α,21-triol-3,20-dione*

1,4,6 - pregnatriene - 11β,14α,17α,21 - tetrol - 3,20-dione (0.5 g.) is dissolved in 20 ml. of methanol and nitrogen is bubbled through the solution. To this is added a solution of 0.14 g. of potassium bicarbonate in 1 ml. of water and the mixture is stirred for eight hours at room temperature. The solution is concentrated in vacuo and addition of water gives crystals which are collected and dried. Recrystallization from acetone-hexane gives 1,4,6,8(14) - pregnatetraene - 11β,17α,21 - triol-3,20-dione.

The same product is obtained by the same procedure when 0.5 g. of 1,4,6-pregnatriene-11β,14α,17α,21 - tetrol-3,20-dione 21-acetate is used as the starting material.

EXAMPLE 19

*1,4,6,8(14)-pregnatetraene-17α,21-diol-3,11,20-trione*

1,4,6 - pregnatriene - 14α,17α,21 - triol - 3,11,20-trione (0.5 g.) is heated at 90–100° C. for ½ hour in 5 ml. of 95% acetic acid. Five ml. of water is added and the mixture is cooled to give crystals which are filtered off and dried. Recrystallization from acetone gives 1,4,6,8(14) - pregnatetraene - 17α,21 - diol - 3,11,20-trione.

When this process is applied to 0.5 g. of 1,4,6-pregnatriene - 14α,17α,21 - triol - 3,11,20 - trione 21-acetate, dilution with water gives a product which is collected, dried, recrystallized from methanol to give 1,4,6,8(14) - pregnatetraene - 17α,21 - diol-3,11,20-trione 21-acetate.

EXAMPLE 20

*9α-fluoro-1,4,6,8(14)-pregnatetraene-11β,17α,21-triol-3,20-dione*

A same of 0.5 g. of 9α-fluoro-1,4,6-pregnatriene-11β,14α,17α,21-tetrol-3,20-dione 21-acetate is treated as in Example 19 leading to a product which, on recrystallization from methanol gives 9α-fluoro-1,4,6,8(14)-pregnatetraene - 11β,17α,21 - triol - 3,20 - dione 21-acetate.

A sample of 0.2 g. of this substance is dissolved in 8 ml. of methanol and nitrogen is bubbled through. To the solution is added 0.53 g. of potassium bicarbonate in 0.53 ml. of water and the mixture is maintained under nitrogen for 4 hours. Dilution with water gives a solid which is collected, dried and recrystallized from aqueous acetone to give 9α-fluoro-1,4,6,8(14)-pregnatetraene-11β,17α,21-triol-3,20-dione.

EXAMPLE 21

*9α-bromo-1,4,6,8(14)-pregnatetraene-11β,17α,21-triol-3,20-dione 21-acetate*

A sample of 0.4 g. of 9α-bromo-1,4,6-pregnatriene-11β,14α,17α,21-tetrol-3,20-dione is dissolved in 4 ml. of acetic anhydride while heating to 90–100° on a steam bath for 1 hour. The solution is cooled, treated with 4 ml. of methanol and poured into 40 ml. of water. The precipitate is filtered off, dried and recrystallized from aqueous methanol to give 9α-bromo-1,4,6,8(14)-pregnatetraene-11β,17α,21-triol-3,20-dione 21-acetate.

EXAMPLE 22

*9α-fluoro-1,4,6,8(14)-pregnatetraene-17α,21-diol-3,11,20-trione*

A sample of 0.2 g. of 9α-fluoro-1,4,6-pregnatriene-14α,17α,21-triol-3,11,20-trione is dissolved in 20 ml. of methylene chloride and passed through a 10 cm. column of 20 g. of acid-washed and activated alumina (100–200 mesh). The fraction eluted with 2–5% methanol in methylene chloride is evaporated and crystallized from acetone-hexane to give 9α-fluoro-1,4,6,8(14)-pregnatetraene-17α,21-diol-3,11,20-trione.

When the starting material is the corresponding 21-acetate, the product, which is crystallized from aqueous acetone is 9α-fluoro-1,4,6,8(14)-pregnatetraene-17α,21-diol-3,11,20-trione 21-acetate.

EXAMPLE 23

*9α-chloro-1,4,6,8(14)-pregnatetraene-17α,21-diol-3,11,20-trione*

A sample of 0.2 g. of 9α-chloro-1,4,6-pregnatriene-14α,17α,21-triol-3,11,20-trione is treated as in Example 19. The product obtained on precipitation with water is crystallized from acetone-hexane to give 9α-chloro-1,4,6,8(14)-pregnatetraene-17α,21-diol-3,11,20-trione.

EXAMPLE 24

*1,4,6,8(14)-pregnatetraene-11β,17α,21-triol-3,20-dione 21-(5'-tert.-butyl)furoate, 21-acetate, and 21-heptanoate*

A sample of 0.5 g. of the product of Example 18 is dissolved in 5 ml. of dry pyridine and chilled to −5°. To this is added 0.3 g. of 5-tert.-butylfuroyl chloride and the mixture is stirred 15 minutes at 0° and 30 minutes at room temperature. The mixture is poured into 50 ml. of water and the dried precipitate is crystallized from methanol to give the desired ester.

The same procedure using 0.25 g. of acetic anhydride in place of tert.-butylfuroyl chloride gives the corresponding 21-acetate which is recrystallized from methanol.

The same procedure using 0.3 g. of heptanoyl chloride in place of acetic anhydride gives the corresponding 21-heptanoate which is recrystallized from aqueous acetone.

This application is a continuation-in-part of our application, Serial No. 559,514, filed on January 17, 1956, now abandoned.

We claim:

1. Unsaturated pregnanes of the formula:

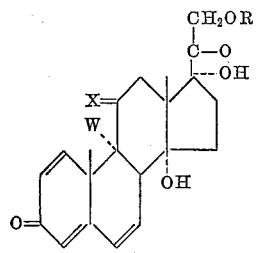

wherein X is a member of the group consisting of O and (H,OH); R is a member of the group consisting of H and acyl radicals of lower alkanoic acids and W is a member of the group consisting of H and halogen having an atomic number less than 53.

2. A compound having the structure:

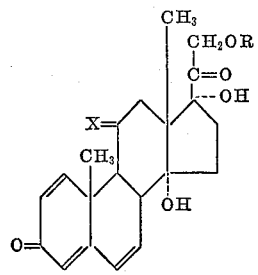

wherein X is chosen from the group consisting of O; and

and R is chosen from the group consisting of hydrogen and a hydrocarbon acyl group having between one and three carbon atoms.

3. 21-lower alkanoic acid esters of 9α-W-1,4,6-pregnatriene-11β,14α,17α,21-tetrol-3,20-dione wherein W is halogen having an atomic number less than 53.

4. 21-lower alkanoic acid esters of 1,4,6-pregnatriene-14α,17α,21-triol-3,11,20-trione.

5. 1,4,6-pregnatriene-14α,17α,21-triol-3,11,20-trione.

6. 9α-fluoro-1,4,6-pregnatriene-11β,14α,17α,21-tetrol-3,20-dione.

7. 21-lower alkanoic acid esters of 9α-W-1,4,6-pregnatriene-14α,17α,21triol-3,11,20-trione wherein W is halogen having an atomic number less than 53.

8. 21-lower alkanoic acid esters of 1,4,6-pregnatriene-11β,14α,17α,21-tetrol-3,20-dione.

9. 9α-W-1,4,6-pregnatriene-11β,14α,17α,21-tetrol - 3,20-dione wherein W is halogen having an atomic number less than 53.

10. 9α-W-1,4,6-pregnatriene-14α,17α,21-triol - 3,11,20-trione wherein W is halogen having an atomic number less than 53.

11. 1,4,6-pregnatriene-14α,17α,21-triol - 3,11,20 - trione 21-propionate.

12. 1,4,6-pregnatriene-14α,17α,21-triol - 3,11,20 - trione 21-acetate.

13. 1,4,6-pregnatriene-11β,14α,17α,21-tetrol-3,20-dione 21-acetate.

14. 9α-fluoro-1,4,6-pregnatriene-14α,17α,21-triol - 3,11,20-trione 21-acetate.

15. 9α-fluoro-1,4,6-pregnatriene-11β,14α,17α,21-tetrol-3,20-dione 21-acetate.

16. 1,4,6-pregnatriene-11β,14α,17α,21-tetrol-3,20-dione.

17. 1,4,6-pregnatriene-11β,14α,17α,21-tetrol-3,20-dione 21-caproate.

18. 9α-fluoro-1,4,6-pregnatriene-14α,17α,21-triol - 3,11,20-trione.

19. 9α-bromo-1,4,6-pregnatriene-11β,14α,17α,21-tetrol-3,20-dione.

20. 9α-chloro-1,4,6-pregnatriene-14α,17α,21-triol-3,11,20-trione.

References Cited in the file of this patent

UNITED STATES PATENTS 2,705,237    Djerassi _____ Mar. 29, 1955

OTHER REFERENCES

Fieser et al.: Natural Products Related to Phenanthrene, 3rd ed., page 407 (1949).